(12) United States Patent
Ekman et al.

(10) Patent No.: US 7,731,853 B2
(45) Date of Patent: Jun. 8, 2010

(54) METHOD AND EQUIPMENT FOR PURIFYING AN EXTRACTION SOLUTION FROM AQUEOUS ENTRAINMENT AND IMPURITIES

(75) Inventors: Eero Ekman, Pori (FI); Juhani Lyyra, Espoo (FI); Pertti Pekkala, Espoo (FI); Raimo Kuusisto, Espoo (FI); Bror Nyman, Pori (FI); Jussi Vaarno, Espoo (FI)

(73) Assignee: Outotec Oyj, Espoo (FI)

( * ) Notice: Subject to any disclaimer, the term of this patent is extended or adjusted under 35 U.S.C. 154(b) by 1113 days.

(21) Appl. No.: 10/559,088

(22) PCT Filed: Jun. 1, 2004

(86) PCT No.: PCT/FI2004/000330

§ 371 (c)(1),
(2), (4) Date: Nov. 30, 2005

(87) PCT Pub. No.: WO2004/108245

PCT Pub. Date: Dec. 16, 2004

(65) Prior Publication Data

US 2006/0113246 A1    Jun. 1, 2006

(30) Foreign Application Priority Data

Jun. 10, 2003    (FI) .................................. 20030861

(51) Int. Cl.
*B01D 21/02* (2006.01)

(52) U.S. Cl. ............... 210/634; 210/511; 210/519; 210/522; 210/532.1; 210/538; 210/801; 210/802; 210/803; 423/24; 423/27; 423/658.5; 422/70; 422/256; 422/258

(58) Field of Classification Search ............... 210/511, 210/519, 521, 522, 538–540, 634, 639, 800–804, 210/532.1; 422/69, 70, 10, 256–261; 423/24, 423/27, 658.5

See application file for complete search history.

(56) References Cited

U.S. PATENT DOCUMENTS

| 863,168 | A | * | 8/1907 | Griswold | 422/261 |
| 3,966,569 | A | | 6/1976 | Reinhardt et al. | |
| 4,268,484 | A | * | 5/1981 | Gavin | 422/259 |
| 4,747,948 | A | * | 5/1988 | North | 210/633 |
| 5,662,861 | A | | 9/1997 | Taylor | |
| 5,662,871 | A | * | 9/1997 | Nyman et al. | 422/259 |
| 6,033,575 | A | * | 3/2000 | Perret et al. | 210/703 |
| 6,083,400 | A | | 7/2000 | Nyman et al. | |
| 6,132,615 | A | * | 10/2000 | Nyman et al. | 210/634 |
| 6,267,900 | B1 | * | 7/2001 | Nyman et al. | 210/800 |
| 7,390,420 | B2 | * | 6/2008 | Nyman et al. | 210/802 |

* cited by examiner

*Primary Examiner*—Joseph W Drodge
(74) *Attorney, Agent, or Firm*—Chernoff, Vilhauer, McClung & Stenzel, LLP (57) ABSTRACT

The invention relates to a method and equipment with which an organic solution extraction solution is purified from entrainment of aqueous solution and impurities during hydrometallurgical liquid-liquid extraction. The method treats an organic extraction solution, which is loaded with a valuable metal or valuable substance from the aqueous solution. The purpose is to carry out the physical separation of water droplets and the chemical removal of impurities from the organic extraction solution simultaneously.

33 Claims, 4 Drawing Sheets

METHOD AND EQUIPMENT FOR PURIFYING AN EXTRACTION SOLUTION FROM AQUEOUS ENTRAINMENT AND IMPURITIES

FIELD OF THE INVENTION

The invention relates to a method and equipment with which an organic extraction solution is purified from entrainment of aqueous solution and impurities during hydrometallurgical liquid-liquid extraction.

BACKGROUND OF THE INVENTION

During liquid-liquid extraction, an organic reagent solution is mixed, in an extraction cell (mixer-settler) or in a column, into an aqueous solution, which contains a substance to be purified and concentrated as soluble, metal usually in ion form or as a complex together with several impurities. The valuable metal or substance to be refined reacts selectively with an organic extraction chemical, whereby it is separated from the aqueous solution into the extraction chemical as a pure form. The valuable metal or substance can then be separated from the organic solution back into the aqueous solution (stripping) with the inverted chemical reaction to extraction, from which aqueous solution it can be recovered again as a product e.g. by precipitation or reduction into metal.

The extraction process is thus mixing liquids physically insoluble in each other into droplets or a dispersion in the mixing section of the extraction equipment, and after chemical mass transfer occurs the droplets in the dispersion are made to coalesce i.e. to recombine back into the original layers of liquid in the settling section or settler. Intensive mixing or a significant change in the surface chemistry conditions of the process may result in very small droplets, which require a lot of time to disengage to its own liquid phase. These droplets do not necessarily have time to disengage in the actual settling section of the extraction step, but move further on in the process with the other phase. The inclusion of the original feed solution (aqueous solution) in the organic solution as it enters later process stages may weaken the purity of the final product and demand extra purification measures. Likewise the organic extractant may end up lost with the treated aqueous solution. In both cases the cost efficiency of the process is lessened.

In particular, a tank has been used for the removal of aqueous entrainment from a organic solution after the extraction cells, in which the entrained water droplets fall towards the bottom of the tank due to the force of gravity and the purified surface layer can be routed to the next process stage, which tank is then called an after-settler. The tank can also function simultaneously as a surge tank, which is needed to even out changes in the volume of organic solution occurring in various parts of the process. In this case the surface level of the solution in the tank varies.

The actual purification method of the organic solution, scrubbing, occurs using mixer-settler cells, in which basically the chemically bound impurities are removed by treating the organic solution with suitable aqueous solutions. In this case therefore a dispersion of extraction solution and aqueous solution is formed in order to achieve a large liquid-liquid surface area, as in an extraction cell. Besides chemical scrubbing, water droplets are also removed or the impurities contained in them are diluted. A mixer-settler cell built for scrubbing purposes generally consists of a pump, a mixer and a settling tank with its retaining fences, and is usually the size of an extraction cell. Changes in organic solution volume cannot be balanced with a scrubbing cell, so a separate surge tank as mentioned above is needed, which has the required volume capacity.

OBJECT OF THE INVENTION

The method according to the present invention treats an organic extraction solution from hydrometallurgical liquid-liquid extraction, which is loaded with a valuable metal or valuable substance from an aqueous solution. The purpose is to carry out the physical separation of water droplets and the chemical removal of impurities from the organic extraction solution simultaneously.

The organic solution to be purified is scrubbed with an acidic aqueous solution. The aqueous solution may be fed into the organic solution even before the solution is sent to the settling tank and/or it can be fed into the organic solution at the front end of the tank. The organic solution is made to discharge into the feed end in several separate sub-streams evenly across the whole width of the tank. In order to separate the small water droplets from the extraction solution and to wash it from impurities, the direction of the flow proceeding horizontally towards the rear end of the tank is diverted obliquely from time to time to the vertical. Simultaneously the cross-sectional area of the flow is momentarily decreased several times while the direction of the separated solutions is deflected sideways by means of picket fences. The pure organic extraction solution and the aqueous solution are removed from the settling tank from the rear end in several separate sub-streams.

When the organic solution and the scrubbing solution used for this purification are made to proceed from the feed end of the settling tank towards the rear end and when the solutions are made to proceed in a vertical direction in addition to a horizontal one, the solutions become well mixed. At the same time as the direction of flow is made partially vertical, the cross-sectional area of the flow is momentarily reduced, whereby the small water droplets are made to combine into larger drops and the scrubbing effect of the scrubbing solution is intensified. The solution stream also moves laterally when it moves through overlapping slots in the picket fence.

The settling equipment according to the invention consists of an essentially rectangular settling tank, which comprises a feed end and a rear end, two sides and a bottom. At least one feed pipe, which is connected at one end to the organic solution feed connection, is arranged into the settling tank feed end. The feed pipe is equipped with several separate discharge elements evenly spaced across the whole width of the tank, after which several picket fences are located when viewed in the direction of flow. The picket fences are arranged so as to be inclined towards the rear end of the tank and each of them is made up of several slotted elements extending from one side of the tank to the other. The width of the slots in each slotted element and their location in relation to each other in the picket fence is arranged to alter in order to change the direction of flow, at times diagonally vertical and/or sideways. The rear end of the tank is equipped with at least one organic solution outlet pipe, of which one end is connected to the corresponding outlet connection. The outlet pipe in turn is equipped with several suction elements to remove the scrubbed organic solution evenly throughout the whole width of the tank. There is a well in the bottom of the rear of the tank to collect the aqueous solution. The tank well is equipped with at least one aqueous solution outlet pipe, which is again equipped with several suction elements to remove the aqueous solution evenly throughout the whole width of the tank.

With the equipment according to the invention, the functions, which ordinarily have required both a separate after-settler and scrubbing equipment can now be performed in a single unit. One of the beneficial features of the equipment is its function as organic solution volume equalising tank for one extraction process unit. The tank also functions as a safety tank, in which organic solution can be stored in emergency situations, such as when there is a threat of fire or during malfunctions. The method and equipment of the invention are intended for application mainly in extraction processes operating horizontally, as distinct from columns.

The essential features of the invention will be made apparent in the attached claims.

SUMMARY OF THE INVENTION

The equipment consists of a rectangular-based settling tank, where organic solution is fed into the feed end and scrubbed solution is discharged from the other end. The height of the tank is such that it both allows for the total volume during process operation and thus a large variation in residence time, as well as acting as a storage tank for all the organic solution in the process. The residence time of the extraction solution in the tank is around 15-30 min.

The infeed of the solution into the settling tank occurs from at least one feed connection into at least one feed pipe, the "bypass manifold". The settling tank is preferably located in the arrangement at a lower level than the extraction stages, so that the solution feed takes place advantageously by free flow. Pumping is undesirable at this stage, because it makes the water seepage droplets in the extraction solution decrease in size even more than before. The feed pipe is equipped with several discharge elements so that the volume flow of the solution entering the tank is divided evenly into several sub-streams. This avoids lateral flows and eddies that would disturb the free settling of the droplets. The discharge element may be either a pipe attached to the feed pipe or an opening in the feed pipe. The organic solution is fed below the surface of the liquid directing it diagonally downwards in the feed end to the aqueous layer at the bottom, whereby water coalescence occurs and a water contact surface is formed, to which the small water drops to be removed can join. If required, the bottom of the tank at the feed end can be equipped with a well. At least part of the aqueous solution for scrubbing the organic solution is preferably fed into the organic solution before it is sent to the settling tank.

In order for the extraction solution and the scrubbing solution to be dispersed in each other, the flow rate of the extraction solution sub-stream is 0.7-1.5 m/s, preferably 0.9-1.2 m/s. The feed pipes are placed upwards from the bottom of the tank so that there is a clearance below them of between $\frac{1}{20}$-$\frac{1}{10}$ of the depth of the tank. The downward-directed flow circulates first towards the feed end, turning from there towards the rear of the tank.

The first flow-balancing picket fence is located across the tank after the feed pipe, and consists of vertical slotted elements, which overlap each other. In the first two slotted elements of the first picket fence the slotted zone is only in part of the elements and otherwise they are solid. The third element consists of a full-height slotted zone. The fence evens out the solution streams in the vertical and horizontal directions so that the solution flow starts to advance as evenly as possible, approaching plug flow in form.

The function of the first picket fence is to even out the solution streams in the vertical and horizontal directions so that the solution flow starts to proceed evenly towards the rear of the tank. In addition, its function is to promote the separation of small water droplets or water seepage from the organic solution. One purpose is also to improve the contact between the extraction solution and the aqueous solution that will scrub it. Therefore this picket fence may also be called a contact fence.

In addition to the solution flow-equalising contact fence, at least one, preferably 3-5 additional picket fences are placed downstream, which have the function of both calming and directing the stream and also acting as impact surfaces, where the water droplets can combine into bigger droplets as they move through the slots in the fences. The slotted elements in the picket fences are mainly the same type as the third element of the first picket fence, or at least like the first, third and then every subsequent element of the fence. All the fences are inclined downstream, so that they direct the solution streams so that the water at the bottom of the tank rises along the inclined fence to intensify the scrubbing effect. In addition, there is a free area at the rear of the tank, where no fences or other barriers are placed in order to obtain as calm and non-turbulent a flow pattern as possible thus enabling the last droplets to settle before the solution discharging point.

The picket fences consist of narrow upright slotted elements made of lamella plates placed vertically, which are described in detail later. In one fence 3-6 elements are placed consecutively, so that the slots overlap in the direction of flow and the solution also has to flow laterally to contact as much of the element surface as possible.

In one embodiment of the present invention the second element of the picket fences following the contact fence differs from the others in that it is solid from the bottom of the tank upwards for a distance of 20-10% of the height of the tank. In this way the solid part of the element in the nearest picket fence to the contact fence is larger than in the fences further away in the direction of flow. The slots in the slotted zone of the second element are also 30-10% wider than the other element slots in the same picket fence so that the widest slots are in the picket fence elements following the contact fence.

The sloping of the picket fences together with the damming effect of the second fence element also in turn improves the contact between the extraction and scrubbing solution. The scrubbing solution has to rise along the lower section of the second element to the slotted zone, in which the flow occurring through the slots further disperses the scrubbing solution into the extraction solution. Thus part of the water seepage entrained in the organic solution is made to impact continuously with the scrubbing solution and separate into it. The chemical effect of the extraction solution continues at the same time.

In one embodiment of the invention a baffle element placed perpendicularly upwards is arranged between the picket fences, where the height of the element from the bottom upwards is 25-6% of the total height of the tank. The baffle element is higher the nearer it is to the contact fence. Depending on the location of the baffle element it may be solid at the lower section and have a slotted zone in the top section or the baffle element may be slotted throughout its height. The combined effect of the contact fence and the baffle element is that the whole stream of organic solution is forced to flow through the narrow slots of the contact fence or the baffle element at some stage, which intensifies the scrubbing effect of the solution.

In one embodiment of the invention the damming section of the second element of the picket fence is formed so that it is always larger than the damming effect of the baffle element before the picket fence concerned. The function of the baffle element, like that of the second element of the picket fence, is to dam up the aqueous solution (scrubbing solution) flowing into the bottom of the LO-cell, so that the organic and aqueous solutions come into contact each other. This enables the mechanical cleaning of the organic solution from residual water drops and also chemical cleaning as a result of the acid contained in the scrubbing solution.

In one embodiment of the invention mesh elements are placed in the passage formed between the picket fence elements. The mesh element preferably extends from one side of the LO tank to the other, like the picket fences. It is preferable to construct the mesh element from several modules, which are replaceable. The mesh size of the mesh element is preferably in the region of 5-10 mm. The mesh element further intensifies the formation of large water droplets, which settle to the bottom of the LO tank.

The settling equipment has a well at the solution discharge end, in which a water layer separated from the organic solution and moving against its lower edge accumulates. The aqueous solution is partially sent back to the front end of the tank, where it is fed again as droplets into the incoming solution. The aqueous solution or scrubbing solution is fed into the passages between the contact fence elements, preferably into the passage between the first and second elements. A second fraction of the water can be fed if necessary even before this into the scrubbing solution pipeline through suitable nozzles or freely from above the surface. Thirdly, the impurity-rich aqueous solution is removed from the process for instance by routing it to the extraction feed solution (aqueous solution), so that the valuable metal or substance can be recovered.

The removal of small water droplets is therefore based in this method on several factors. Before the settling tank the water stream to be fed into the pipeline is dispersed into the organic solution in droplets, of a considerably larger size than the droplets to be removed. These drops together form a surface area onto which some of the small droplets can coalesce. When the stream has proceeded to the feed end of the settling tank, by directing the organic solution the aqueous layer at the bottom is made to disperse into drops again, which travel with the flow, settling towards the bottom while trapping other water droplets. The water drops moving in the solution to be purified also collide with the picket fences and any mesh elements that may be between the elements, forming a continuous film of water on the surface: a hydrophilic surface, which provides the water droplets with a convenient adhesive base.

Extraction processes are used in conditions where the extraction chemicals work as selectively as possible, so that the desired valuable metal or substance can be recovered in a sufficiently pure form. Mostly, however, various impure substances bind themselves chemically to the extractant in addition to the desired substance in such great quantities that scrubbing methods have to be used to prevent the impurities from proceeding up to the end product. In this way scrubbing solutions based on the ion exchange effect, e.g. pH value, or those containing a purifying substance can be used, in order to displace impurities from the extraction chemicals.

In the equipment according to the invention, the abovementioned chemical washing can be performed in combination with the physical removal of small water droplets. Aqueous solution containing valuable metals or substances to be cleaned e.g. from elsewhere in the process, is added to the water for water droplet collection, so that the valuable metal or substance is transferred in the ion exchange occurring during treatment to replace the impurities. Alternatively, the extractant complex containing impurities becomes unstable in the pH of the wash water, releasing the impurities into the scrubbing solution. The method can thus also be used to take care of the liquid balance of the process and to get the valuable metals or substances from the process waters back into circulation. The amount of aqueous solution circulating in the settling tank is quite small in relation to the amount of extraction solution, so the tank cannot be compared with the settler section in extraction. The amount of aqueous solution is around $1/6$-$1/10$ of the amount of organic solution when the scrubbing solution is fed into the tank, and even less if the purpose is to separate out only the water droplets in the organic solution. This equipment does not include a mixing section typical of extraction steps either.

The scrubbed extraction solution is removed from the equipment by suction with a pump through at least one outlet pipe, which is the same type as the feed pipe. The solution is thus sucked up evenly across the whole width of the tank via the suction elements connected to the outlet pipe in several separate sub-streams, which ensures that the flow remains non-turbulent at the rear of the tank. The suction element may be a pipe connected to the outlet pipe or an opening in the outlet pipe. Suction elements are preferably slanted upwards towards the rear of the tank, so that the suction direction slants downwards from the surface of the solution, but nevertheless below the surface. In the same way, the aqueous solution (scrubbing solution) that has separated to the bottom of the tank is removed via at least one outlet pipe and the water suction elements connected to it in several separate substreams. The suction element may be a pipe connected to the water outlet pipe or an opening in the outlet pipe. The water suction elements are preferably slanted towards the bottom i.e. the water suction streams occur diagonally from the bottom upwards.

The chemical purification of organic solution used in liquid-liquid extraction processes in a buffer tank to equalize the solution circuit is not restricted to a metal extraction process of certain kind. The method and equipment described above are, however, highly suitable for example when the valuable substance to be recovered is copper. The same kind of acidic wash is also suitable in most cases for the purification of extraction solution loaded with metal. In sulphate-based processes the oxidising acid used is sulphuric acid as one scrubbing solution component and the other component is generally the metal being extracted in the extraction process. When the final recovery of the metal in question occurs with the electrowinning principle, the electrolyte from electrolysis can be used to make the extraction process scrubbing solution. When for instance the metal to be extracted is copper, the electrolyte contains 30-60 g/l Cu and 150-200 g/l sulphuric acid. Electrolyte is added to pure water so that the $H_2SO_4$ content of the scrubbing solution to be fed into the settler is in the region of 20-50 g/l.

The settling equipment according to the present invention i.e. an extraction solution scrubber tank with fittings, which for the sake of simplicity is referred to hereafter by the abbreviation LO tank (Organic solution Scrubber Tank), is preferably utilised in an extraction process where the solution streams are large. The extractants used in the recovery of copper extract very little other metals besides copper, so that an extraction solution is obtained that is almost pure enough with regard to copper. The meticulous removal of residual water drops combined with a certain chemical scrub often raises the purity of the extractants used sufficiently for the subsequent process, i.e. electrolysis, nor is a separate scrubbing stage always necessary.

If however, the extraction solution contains a larger amount of harmful substances, it should be treated further in a separate mixer-settler-type scrubbing step. In copper extraction these harmful substances are iron, molybdenum and manganese. When the amount of impurities is such that in an ordinary configuration one scrubbing step is not enough, it is now advantageous to use settling apparatus according to this invention in addition to a single scrubbing stage in order to achieve sufficient purity in the extraction solution. In this way the use of several scrubbing stages can be avoided. In some situations sufficient scrubbing can only be achieved with a large quantity of scrubbing solution, which consumes water and increases the circulation of metal via scrubbing. For instance many large copper extraction facilities are located in dry deserts where purified water is itself a significant cost factor. In addition, costs arise from copper circulation when the rinse water used is either routed back to the extraction stage or to the leaching preceding it. In these kinds of situation the use of an LO tank improves the economy of the process.

DESCRIPTION OF DRAWINGS

The equipment of the invention is further described by means of the attached drawings, in which.

DETAILED DESCRIPTION OF INVENTION

Figure 1:
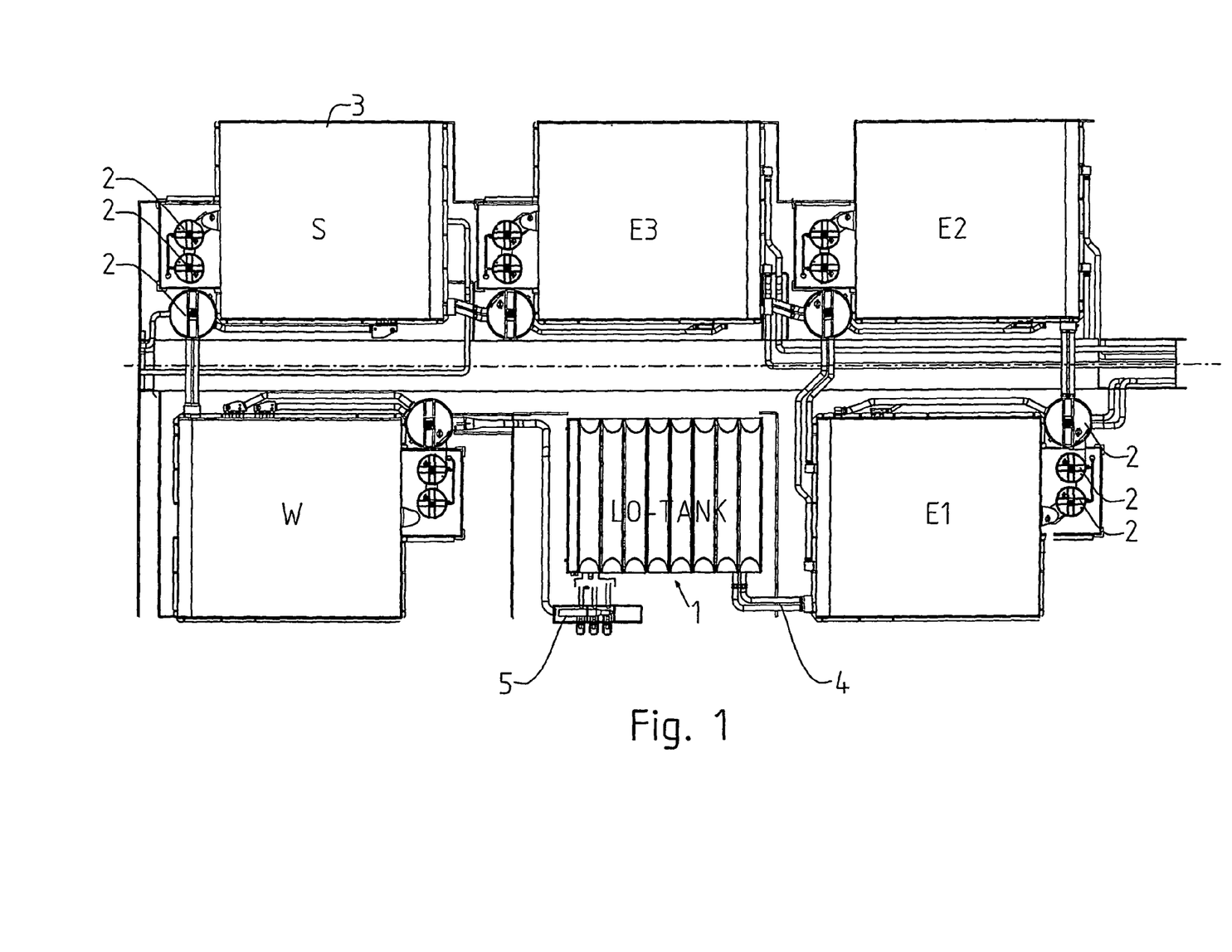
FIG. 1 shows one arrangement of an extraction facility according to the invention seen from above.

FIG. 1 shows how the LO tank 1 i.e. the settling and scrubbing tank of the organic solution, is connected to the rest of the extraction process. The extraction process in the drawing consists of extraction steps E1, E2 and E3, a LO tank, one scrubbing stage W and a stripping stage S. Each extraction, scrubbing and stripping stage includes either one or more mixers 2 and a settler 3 and the necessary pumps and piping. As the drawing shows, there is no mixer section in the LO tank, instead, the organic solution containing a valuable substance is brought there and fed into the tank using a number of feed units 4 and outlet units 5 that is sufficient for the amount of feed. As stated above, the actual scrubbing stage can be omitted if the amount of impurities in the organic solution is small.

Figure 2:
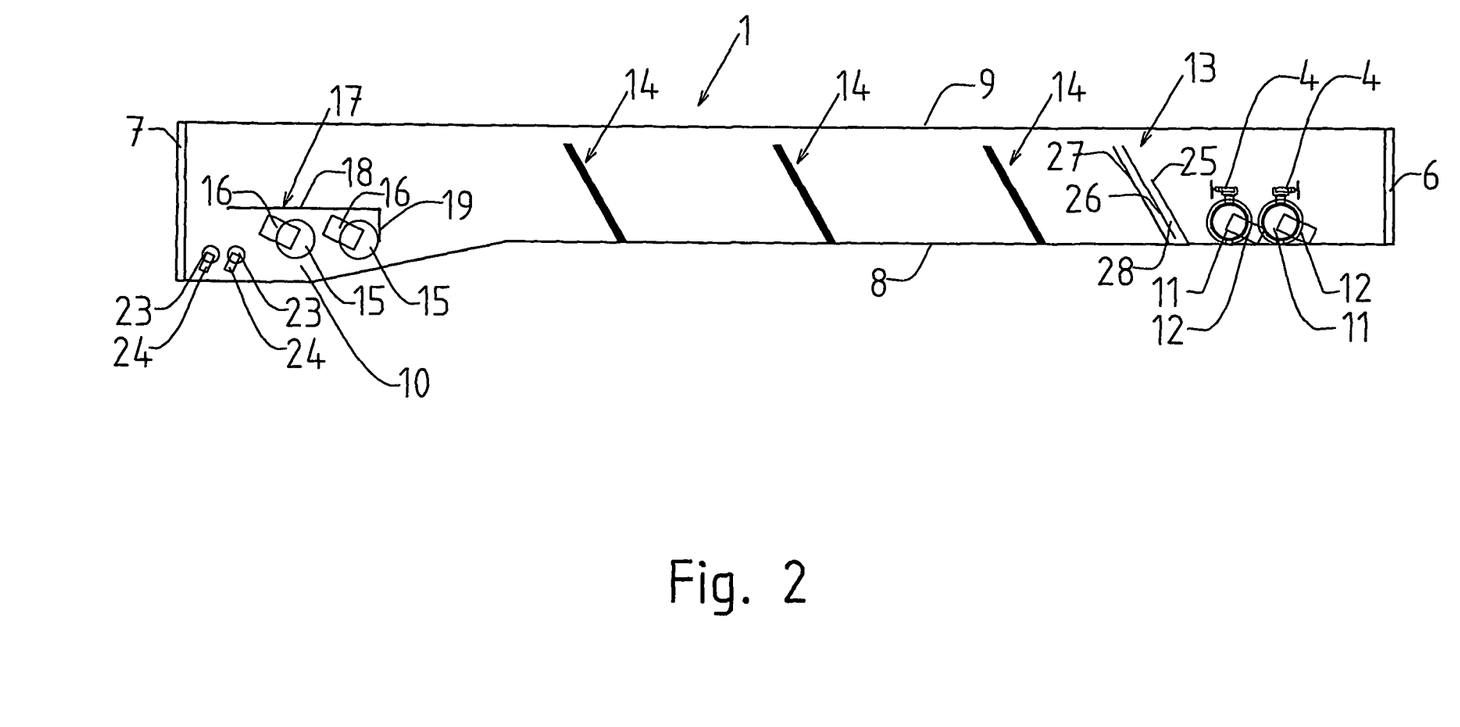
FIG. 2 shows a LO tank of the invention as a longitudinal cross-section.

FIG. 2 shows an embodiment of the LO tank 1 of the invention in more detail. The feed end 6 and rear end 7, bottom 8 and upper edge 9 of the tank are shown. In the bottom of the tank 1, there is an additional well 10 at the rear end for the separated aqueous layer. The depth of the well at the rear is around 1/6-1/3 of the depth of the rest of the tank. The organic solution solution is fed into one or more feed pipes 11 situated in the feed end of the tank via feed unit(s) 4, the number of which depends on the amount of organic solution. In the drawing there are two feed pipes. Each feed pipe is equipped with several discharge elements, which in this case are discharge pipes 12. The discharge pipes are preferably directed diagonally downwards. The tank is equipped with at least two picket fences, of which the first, the contact fence 13, differs somewhat in structure from the other picket fences 14. All the picket fences are preferably inclined towards the rear of the tank. The preferred angle of inclination is about 45-70° to the horizontal.

The scrubbed organic solution in the rear 7 of the tank is recovered via one or more organic solution outlet pipes 15, which are in turn connected to corresponding outlet units. The scrubbed organic solution is sucked evenly across the entire cross-section into the outlet pipes by means of suction pipes 16. The outlet pipes and their suction pipes are arranged the same way as the feed pipes and discharge pipes i.e. a certain amount of the solution to be removed is sucked out via each outlet pipe. The outlet pipes are located at the same point as the well 10 at the bottom of the tank, but inside the organic solution. The suction pipes 16 are preferably directed diagonally upwards towards the rear end 7. In the description of the invention the terms discharge pipes and suction pipes are used, but in principle these could also be openings in the feed and outlet pipes.

In one application of the invention, a protective structure 17 seen in the drawing is arranged on top of the outlet pipes, which consists of an essentially horizontal plate 18 on top of the outlet pipes and a vertical plate 19 attached to its front edge. The vertical plate is located in front of the first outlet pipe in the direction of flow and extends to about halfway down the pipe. The vertical plate may be perpendicular to the horizontal plate 18 as in the drawing or the joint may be profiled as a curve. The horizontally-positioned plate extends a little nearer to the rear end than the rearmost outlet pipe. The protective structure arranged on top of the outlet pipes ensures that only scrubbed organic solution flowing in the upper section that has circulated near the rear of the LO tank is sucked out of the tank and into the following stage.

The aqueous solution that has accumulated in the well 10 is also removed via one or more aqueous outlet pipes 23 and corresponding aqueous outlet units and routed to one or more points in the process, as explained above.

Figure 3:
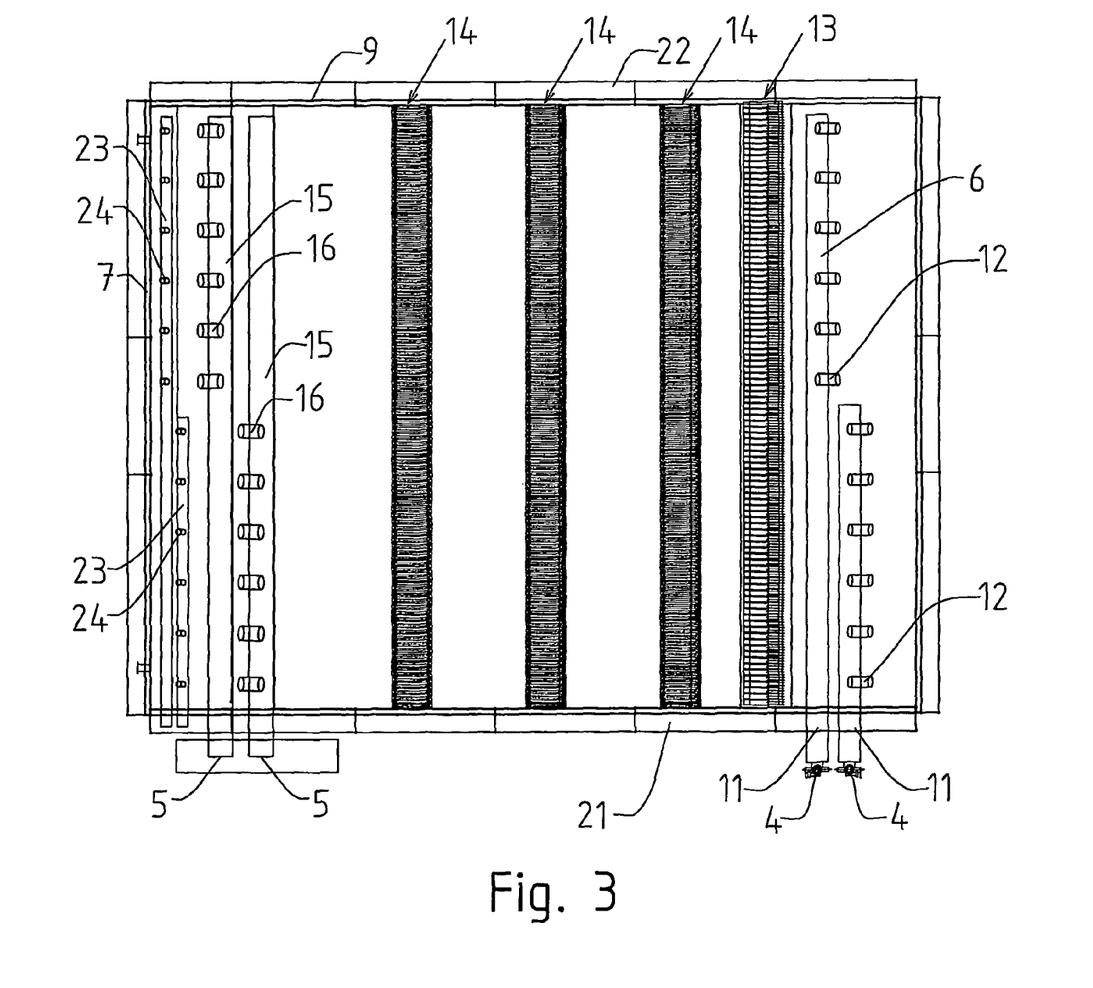
FIG. 3 is a LO tank according to FIG. 2 seen from above.

The number of LO tank feed and outlet connections is determined according to the amount of solution fed into the tank. FIG. 3 shows the LO tank as seen from above, where sides 21 and 22 are also seen. The extraction solution is fed into the feed end of the tank, in this case via two units 4 in the side 21 and removed via two outlet units 5 in the rear end. Each feed unit 4 is in turn connected to a feed pipe or "bypass manifold" 11 in order to distribute the incoming organic solution stream evenly over the entire width of the tank. If there are several feed pipes, the discharge pipes of each feed pipe feeds the organic solution into its own sub-section. The number of sub-sections is the same as the number of feed pipes. When the LO tank is wide, an even feed across the whole width of the tank without major pressure variations is ensured by the use of several feed pipes and discharge pipes situated in their own sub-sections. According to FIG. 3 the first feed pipe extends only about halfway across the width of the LO tank and its discharge pipes feed the solution for about half the width of the tank. The second feed pipe extends as far as the opposite side 22 of the tank, but the organic solution discharge pipes 12 are located only on the side of the tank where the first feed pipe does not reach.

The feed pipe or pipes are preferably placed so that they do not exactly touch the feed end 6 of the LO tank, but come a little short of it. The discharge pipes 12 are correspondingly preferably directed obliquely downwards towards the feed end. As a result, a solution circulation flow forms around the feed pipe. The length of the discharge pipe is preferably at least twice the diameter of the pipe, so that the discharge jets can be angled diagonally downwards towards the aqueous layer forming on the bottom.

Correspondingly, the scrubbed organic solution in the rear end of the tank 7 is sucked evenly across the whole cross-section via one or two outlet pipes 15, which are equipped with suction pipes 16. For reasons of clarity the protective structure 17 has been omitted in the drawing. The outlet pipes and their suction pipes are arranged in the same way as the feed pipes and discharge pipes i.e. as many parts of the solution to be removed are sucked up via each outlet pipe as is required by the number of outlet pipes.

The aqueous solution that has accumulated in the well 10 is removed in exactly the same way via one or more aqueous outlet pipes 23, which are also equipped with their own suction pipes 24. The aqueous suction pipes are preferably directed obliquely downwards. The suction pipes may also be directed to the rear section of the tank. The aqueous outlet pipes and their suction pipes are also arranged in the same way as the feed pipes and discharge pipes i.e. a certain amount of the solution to be removed is sucked up via each outlet pipe. It is advantageous to remove more solution via the aqueous suction line than the amount that is separated from or fed to the extraction solution, since in this way the purity of the organic solution is ensured as regards aqueous entrainment. Thus some organic solution from the bottom of the organic layer is also sucked up along with the aqueous solution. The amount of organic solution sucked up with the aqueous solution is at the most about half the amount of aqueous solution sucked up. Some of the aqueous solution, which consists mainly of scrubbing solution used for scrubbing the organic solution, is preferably to recirculate into the organic solution fed into the tank even before the latter is fed into the tank. Some of the scrubbing solution can be fed directly into the tank at the contact fence. It is however also appropriate to remove a part of the accumulated aqueous solution completely from the circuit from time to time, because it contains impurities that have dissolved out of the organic solution, such as iron.

If the number of feed or outlet pipes is increased, the discharge and suction pipes are distributed as described above. If there are three pipes, one third of the solution is fed from each pipe etc.

As shown in FIGS. 2 and 3 also, the LO tank is equipped with several picket fences 13, 14, which are set diagonally towards the rear of the tank. The purpose of these structures is to improve both the separation of the water seepage from the organic solution into larger droplets and to improve the contact between the extraction solution and the scrubbing solution. Each picket fence consists of several elements in the same direction.

The first picket fence 13 is located quite close to the organic solution feed pipes 11. It consists of at least three elements, extending from one side of the LO tank to the other. FIG. 2 shows that the first element 25 of the contact fence is situated so as to extend as far as the bottom 8 of the LO tank and that its upper edge reaches a height which is preferably 50-70% of the height of the whole tank. About one third of the upper section of the first element is provided with a slotted zone otherwise the element is solid. Vertical slots are arranged in the slotted zone, with a preferred width of around 2-3 mm and a distance from each other that is 30-60 times the width of the slot. Only a small amount of the organic solution flows through the slots, as the rest flows above the element into the passage formed by the latter and the following element. The second element 26 is situated at a depth so that the distance between its lower edge and the bottom of the tank is 15-20% of the height of the tank and the distance of the upper edge from the upper edge of the tank is around 12-17% of the height of the tank. About one third of the lower section of the second element is preferably provided with the same kind of vertical slotted zone as the upper section of the first element, otherwise the element is solid. The narrow slots of the elements promote the formation of larger droplets from the water seepage. The third element 27 of the contact fence is situated so as to extend to the bottom and its upper edge to about the same height as the second element. The third element has vertical slots along the whole height of the element, but their width is 40-60 mm and the distance from each other is about twice that of the slot width. The distance of the passages left between the elements is basically the same.

When scrubbing solution is fed directly into the LO tank, it is done preferably by disseminating the droplets of scrubbing solution into the organic solution at the point of the contact fence. The contact of the solutions is further improved by guiding the scrubbing solution into the passage 28 between the first and second elements.

It is further preferable to place 2-5 other picket fences 14 in the LO tank, to promote the growth of small droplets of aqueous solution and the scrubbing of impurities from the organic solution. The subsequent picket fences of the contact fence are largely similar to each other i.e. they consist of several elements in the same direction and extending from one side of the tank to the other. The height of the elements is about the same as that of the third element 27 of the contact fence, in other words they extend from the bottom of the tank upwards and the distance of their upper edge from the upper edge of the tank is around 12-17% of the height of the tank. The elements are provided with the same type of slots as the third element of the contact fence, but the element slots are situated in relation to each other so that they overlap, so that the distance the solution flows between the elements is as long as possible. The number of elements in each picket fence is 3-6.

Figure 4:
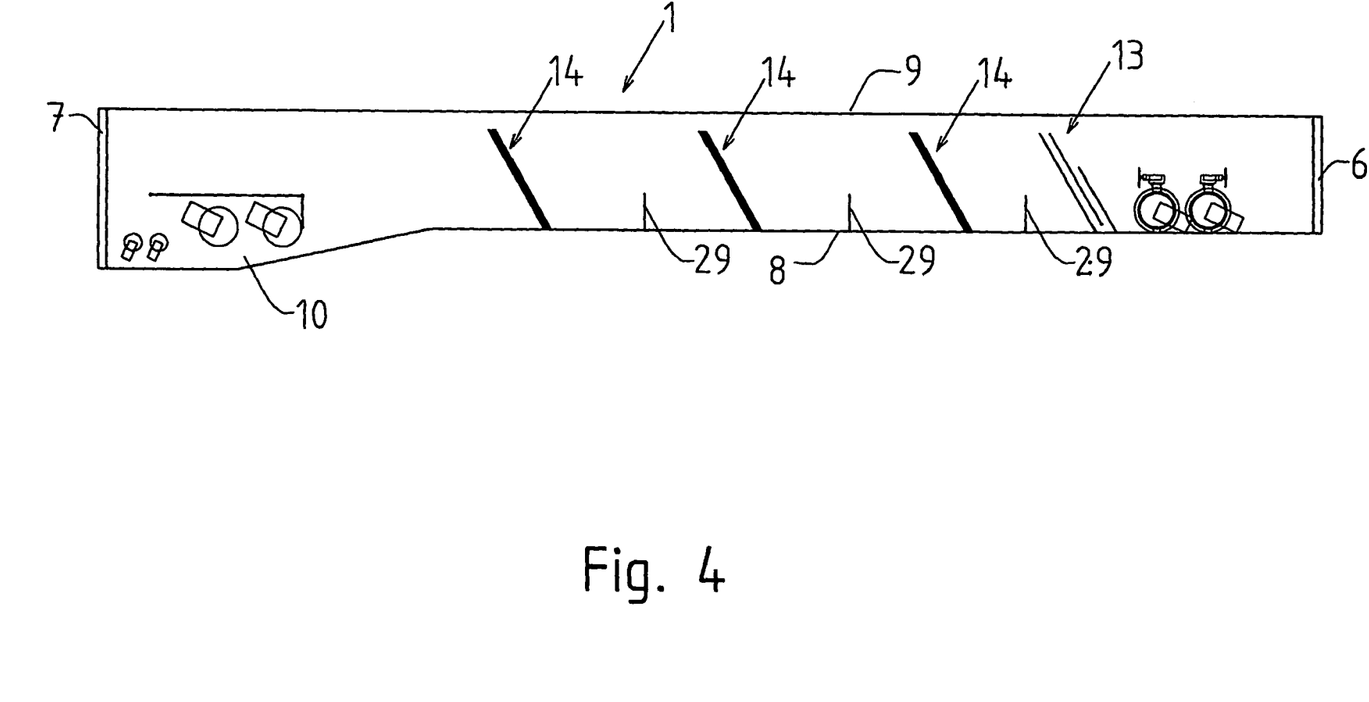
FIG. 4 shows another embodiment of the LO tank as a longitudinal cross-section.

FIG. 4 presents an embodiment of the invention where at least one baffle element 29 placed perpendicularly upwards is arranged between the picket fences, with a height from the bottom 8 of 25-6% of the total height of the tank. Baffle elements are always placed between the picket fences and the height is bigger, the nearer they are to the contact fence. Thus the highest element is between the contact fence and the following picket fence and the second highest in the following gap. Depending on its location the baffle element may be solid in the lower section and have a slotted zone in the top or it may have a slotted zone throughout its height. The width of the slots in the slotted zone and the distance from each other is about the same as in the first and second elements of the contact fence. The width of the slots is thus 2-3 mm and the distance between them 30-60 times the width of the slot. At maximum the solid section is in the baffle element nearest the contact fence and it is around 40-60%. The proportion of solid section decreases in the direction of flow of the tank and the slotted zone of the final baffle element extends along the whole height of the element.

The invention is not restricted to the above-mentioned embodiments and it is possible to make adaptations and combinations of the above according to the patent claims within the scope and spirit of the invention.

The invention claimed is:

1. A method for purifying an organic extraction solution, comprising:
providing a settling tank having a feed end and a discharge end and defining a generally horizontal direction of flow from the feed end to the discharge end,
supplying an organic extraction solution containing drops of aqueous solution and a valuable metal or substance separated into it during hydrometallurgical liquid-liquid extraction, for removing drops of aqueous solution and other impurities from the organic extraction solution, to the settling tank at the feed end of the settling tank in several separate sub-streams distributed evenly across the whole width of the tank at the feed end thereof, whereby the organic extraction solution flows in a generally horizontal direction towards the discharge end of the settling tank, at several locations spaced apart along the generally horizontal direction of flow, diverting the direction of flow of the organic extraction solution flowing generally horizontally from the feed end to the discharge end obliquely to the vertical, feeding scrubbing solution into the settling tank near or at a location at which the direction of flow of the organic extraction solution is diverted obliquely to the vertical, at several locations spaced apart along the generally horizontal direction of flow, momentarily decreasing the cross-sectional area of the flow, deflecting the direction of flow laterally by means of picket fences, removing the pure organic extraction solution from the rear end of the settling tank in several separate sub-streams, and removing the pure aqueous solution from the rear end of the settling tank in several separate sub-streams, and wherein the amount of aqueous solution in the settling tank is less than about 1/6 of the amount of organic extraction solution.

2. A method according to claim 1, comprising feeding the organic extraction solution into the settling tank below the surface of the liquid and directing separate sub-flows of the organic extraction solution diagonally downwards towards the feed end of the tank for generating coalescence of the aqueous solution on the bottom of the tank and forming of a water contact surface, in order to adhere small water droplets in the organic solution.

3. A method according to claim 1, comprising using an aqueous solution containing acid as a scrubbing solution, where the amount of acid is in the region of 20-50 g/l.

4. A method according to claim 3, wherein the acid is sulphuric acid.

5. A method according to claim 1, wherein the valuable substance contained in the extraction solution is copper.

6. A method according to claim 1, wherein the amount of aqueous solution in the settling tank is in the region of 1/6-1/10 of the amount of organic extraction solution.

7. A method according to claim 1, wherein the scrubbed extraction solution is removed from the settling tank non-turbulently by sucking it diagonally downwards in several sub-streams from below the surface of liquid at the rear of the tank.

8. A method according to claim 1, wherein the aqueous solution is removed from the settling tank by sucking it diagonally upwards in several sub-streams from the bottom of the rear of the tank.

9. A method according to claim 1, comprising feeding an acidic aqueous scrubbing solution into the settling tank at a location at which the direction of flow of the organic extraction solution is diverted obliquely to the vertical.

10. A method according to claim 9, wherein the acidic aqueous scrubbing solution contains in the region of 20-50 g/l acid.

11. A method according to claim 10, wherein the acid is sulphuric acid.

12. A method according to claim 1, comprising diverting the flow of organic extraction solution obliquely to the vertical by a picket fence located in the settling tank substantially closer to the feed end than to the discharge end.

13. A method according to claim 1, comprising scrubbing the organic extraction solution with an acidic aqueous scrubbing solution prior to routing the organic extraction solution into the settling tank.

14. Settling equipment for use in hydrometallurgical liquid-liquid extraction for scrubbing an organic extraction solution that contains drops of aqueous solution and a valuable metal or substance separated into it during extraction, and where said equipment comprises:

a substantially rectangular settling tank having a feed end, a rear end, two opposite sides and a bottom and defining a generally horizontal direction of flow from the feed end to the rear end, the rear end of the settling tank having a well in the bottom of the tank for collection of aqueous solution, at least one organic solution feed unit, at least one outlet unit, at least one feed pipe at the feed end of the settling tank, the feed pipe being connected at one end to the organic solution feed unit and the feed pipe being equipped with several separate discharge elements evenly spaced across the entire width of the tank, several picket fences positioned in the settling tank and spaced apart in the generally horizontal direction of flow and inclined upwards towards the rear end of the tank, wherein each picket fence extends from one side of the tank to the other side of the tank and comprises several slotted elements, whereby at each picket fence the direction of flow of the organic extraction solution flowing generally horizontally from the feed end is diverted vertically and/or sideways, at least one organic solution outlet pipe at the rear end of the settling tank, the outlet pipe being connected at one end to the outlet unit and said outlet pipe being equipped with several separate suction elements for removing the scrubbed organic solution evenly across the entire width of the tank, at least one aqueous solution outlet pipe in the well at the rear end of the tank, the aqueous solution outlet pipe being equipped with separate several suction elements for removing the aqueous solution evenly across the entire width of the tank, and a scrubbing solution feed pipe located for feeding scrubbing solution into the tank near or at the most upstream picket fence.

15. Equipment according to claim 14, wherein the discharge elements of the feed pipe are directed diagonally downwards towards the feed end of the tank.

16. Equipment according to claim 14, comprising a plurality of feed pipes at the feed end of the settling tank, each feed pipe being equipped with several discharge elements evenly spaced across a discrete sub-section of the tank width, the number of sub-sections being equal to the number of feed pipes.

17. Equipment according to claim 14, wherein the most upstream of the picket fences comprises a contact fence, which is closer to the feed pipe than the other picket fences, and the contact fence comprises first, second and third slotted elements extending from one side of the settling tank to the other side of the settling tank and spaced apart in the horizontal direction of flow, the first slotted element is between the feed end of the settling tank and the second slotted element, and the second slotted element is between the first and third slotted elements.

18. Equipment according to claim 17, wherein the first element of the contact fence extends to the bottom of the tank, has an upper edge at a height of at least about 50% of the height of the tank, has an upper section that is slotted, and is otherwise imperforate.

19. Equipment according to claim 17, wherein the second element of the contact fence has a lower edge located above the bottom of the tank at a height which is about 15-20% of the height of the tank, has an upper edge at a height of about 83-88% of the height of the tank, has a lower section that is slotted, and has an upper section that is imperforate.

20. Equipment according to claim 17, wherein the slots in the first and second elements of the contact fence are about 2-3 mm wide and are spaced by a distance that is 30-60 times the slot width.

21. Equipment according to claim 17, wherein the third element of the contact fence extends to the bottom of the tank, has an upper edge at a height of about 83-88% of the height of the tank, and is formed with slots over substantially its entire height.

22. Equipment according to claim 17, wherein the slots in the third slotted element of the contact fence are 40-60 mm in width and the slots are spaced by a distance about twice the slot width.

23. Equipment according to claim 14, comprising at least first and second picket fences, and wherein the first fence is between the feed end and the other picket fences, the first picket fence is a contact fence, and the second picket fence comprises slotted elements which extend to the bottom of the tank and at least one of which has an upper edge at a height of about 83-88% of the height of the tank.

24. Equipment according to claim 23, wherein the second picket fence comprises at least three slotted elements, at least the first and third slotted elements each include a slotted zone that extends over substantially the entire height of the slotted elements, the slot width is 40-60 mm and the slots are spaced from each other by about twice the slot width.

25. Equipment according to claim 24, wherein the second slotted element of the second picket fence has a lower imperforate region that extends upward from the bottom of the tank to 10-20% of the height of the tank.

26. Equipment according to claim 24, wherein the second slotted element of the second picket fence has a slotted zone in which the slots are 10-30% wider than the slots in the first and second elements of the second picket fence.

27. Equipment according to claim 14, comprising at least first and second picket fences, wherein the first fence is between the feed end and the other picket fences, and the equipment further comprises at least one vertical baffle element between the first and second picket fences, the baffle element having a height that is at least 25% of the height of tank.

28. Equipment according to claim 14, comprising at least first and second picket fences, and wherein the first fence is between the feed end and the other picket fences, and the equipment further comprises a means for introducing scrubbing liquid into the tank at a location close to the first fence.

29. Equipment according to claim 14, comprising a mesh element positioned between the elements of at least one picket fence and extending across the tank from one side to the other side.

30. Equipment according to claim 29, wherein the mesh element has mesh openings that are 5-10 mm in size.

31. Equipment according to claim 14, comprising a plurality of organic solution outlet pipes serving respective sub-sections of the tank width and each provided with suction elements.

32. Equipment according to claim 14, comprising a plurality of aqueous solution outlet pipes serving respective sub-sections of the tank width.

33. A method of carrying out liquid-liquid extraction to separate metal contained in an aqueous solution from impurities in the aqueous solution, said method comprising:
   mixing the aqueous solution with an organic extraction reagent such that metal in the aqueous solution reacts selectively with the organic extraction reagent and is separated from the aqueous solution,
   separating the mixture of aqueous solution and extraction reagent to provide an aqueous solution containing impurities and an extraction reagent loaded with metal and containing droplets of aqueous solution,
   supplying the extraction reagent to a feed end of a settling tank in several separate sub-streams, the settling tank also having a discharge end and defining a generally horizontal direction of flow from the feed end to the discharge, the sub-streams being distributed evenly across the entire width of the tank at the feed end thereof, whereby the extraction reagent flows in a generally horizontal direction towards the discharge end of the settling tank,
   at several locations spaced apart along the generally horizontal direction of flow, diverting the direction of flow of the extraction reagent flowing generally horizontally from the feed end to the discharge end obliquely to the vertical,
   feeding an aqueous scrubbing solution into the settling tank near or at a location at which the direction of flow of the extraction reagent is diverted obliquely to the vertical,
   at several locations spaced apart along the generally horizontal direction of flow, momentarily decreasing the cross-sectional area of the flow,
   deflecting the direction of flow laterally by means of picket fences,
   removing extraction reagent from the rear end of the settling tank in several separate sub-streams, and
   removing aqueous solution from the rear end of the settling tank in several separate sub-stream.

* * * * *